(12) United States Patent
Antanouski

(10) Patent No.: US 7,351,985 B2
(45) Date of Patent: Apr. 1, 2008

(54) PORTABLE WATCH WITH RADIATION MONITOR

(76) Inventor: Aliaksandr Alexeevich Antanouski, Scoriny Avenue, 69-11, Minsk (BY) 220013

(*) Notice: Subject to any disclaimer, the term of this patent is extended or adjusted under 35 U.S.C. 154(b) by 188 days.

(21) Appl. No.: 10/524,741

(22) PCT Filed: Jul. 1, 2003

(86) PCT No.: PCT/BY03/00006

§ 371 (c)(1),
(2), (4) Date: Feb. 14, 2005

(87) PCT Pub. No.: WO2005/003815

PCT Pub. Date: Jan. 13, 2005

(65) Prior Publication Data

US 2006/0163493 A1     Jul. 27, 2006

(51) Int. Cl.
*H05B 33/00* (2006.01)
(52) U.S. Cl. .................................................. 250/484.5
(58) Field of Classification Search ........ 250/374–389, 250/484.5
See application file for complete search history.

(56) References Cited

U.S. PATENT DOCUMENTS

| | | | | |
|---|---|---|---|---|
| 4,461,952 A | * | 7/1984 | Allemand et al. | 250/370.07 |
| 4,596,933 A | * | 6/1986 | Waechter et al. | 250/388 |
| 4,733,383 A | * | 3/1988 | Waterbury | 368/10 |
| 4,857,739 A | * | 8/1989 | Phelps | 250/388 |
| 5,469,412 A | * | 11/1995 | Weise | 368/88 |

* cited by examiner

*Primary Examiner*—David Porta
*Assistant Examiner*—Djura Malevic
(74) *Attorney, Agent, or Firm*—Bardmesser Law Group

(57) ABSTRACT

A wrist-wearable device combines timekeeping functions with monitoring of the radiation dosage to which the user is exposed and of radiation intensity. A Geiger-Muller counter is used as a radiation detector in a wristwatch. A voltage changer changes voltage from 1.5V-3V to 400V to make the Geiger-Muller counter function in wristwatch, by using a voltage pulse converter for Geiger Muller counter power supply. A micro controller is connected to the voltage changer. Switch key control impulses come from the microcontroller; when the signal from the Geiger-Muller counter is received, an additional switch key control impulse is sent. A threshold element is in the transformer primary winding of the compact voltage changer, and is connected to micro controller, while micro controller data bus is connected to bipolar transistor base.

18 Claims, 6 Drawing Sheets

PORTABLE WATCH WITH RADIATION MONITOR

CROSS-REFERENCE TO RELATED APPLICATIONS

Figure 1:
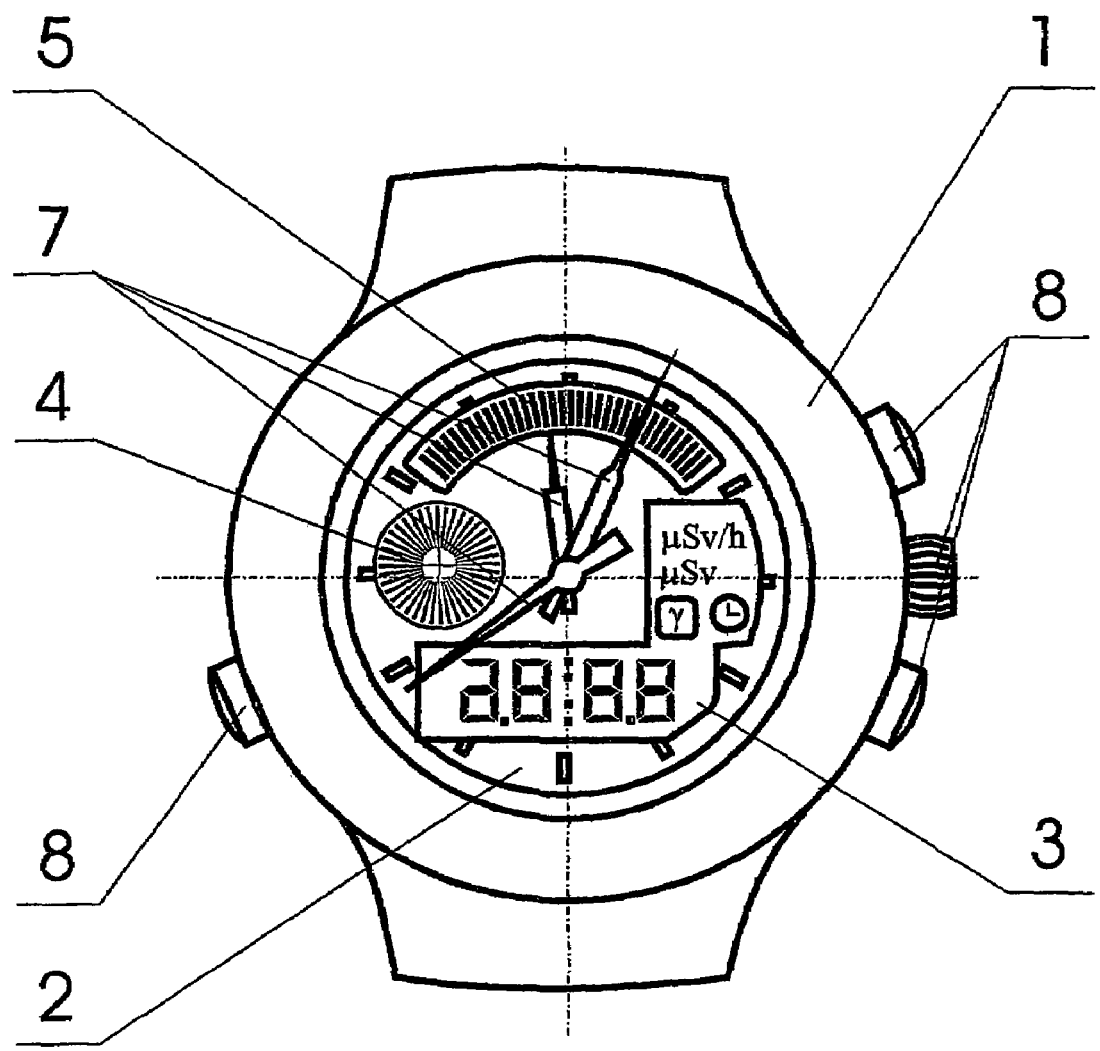

This application is a U.S. National phase of PCT Application No. PCT/BY03/00006, filed Jul. 1, 2003.

TECHNICAL FIELD

The invention relates to combined personal devices in which the timekeeping components cooperate with radiation monitoring components, whereby the watch not only displays time and other time-related data, but also indicates the dosage of penetrating radiation to which the user is exposed, and monitors the existing intensity of the radiation.

BACKGROUND ART

Today, many people live and work in an environment that may contain dangerous levels of radioactivity. The main feature of such radiation is that it is difficult to detect using small-detection devices and there is a possibility of a living organism to accumulate radiation dose. Also, exceeding an acceptable accumulated dosage can lead to fatal consequences—radiation sickness and hereditary disorders.

Therefore, attempts were made to provide human beings with personal device which is always at hand and can indicate not only the existing intensity of penetrating radiation to which the wearer is exposed, but also the dosage of accumulated radiation thereof. One of the first engineering solutions relating to development of such small-size devices was a compact wristwatch and radiation monitor assembly. The assembly consists of an electronic timepiece within digital or analog display, and a component that operates radiation monitor and contains semiconductor detector and controller. A Radiometer is built on the basis of a microprocessor to combine radiation monitoring with timekeeping.

Unfortunately, the device described above does not allow long-term precise monitoring of radiation. First, the semiconductor detector is not precise enough: it is responsive to other types of validation, for example high-frequency omissions from mobile phones and other kinds of effects, including mechanical effects. On the other hand, semiconductor radiation detectors consume a lot energy, and the user has to change power supply units quite often. This is why the producer uses two independent power supplies for each component of the assembly.

The Yperwatch [2] wristwatch (Switzerland) is known. A patent was taken out for this watch in Switzerland, Japan and other countries. The assembly consists of two components: an electronic timekeeper with an analog display, where the hands indicate the information and radiation monitor, and which contains semiconductor detector and controller. This watch features at least two printed-circuit boards connected with each other by a flexible conductor; the mechanism responsible for turning the analog hands of the watch is placed in hollow space on one of the printed-circuit boards.

The Yperwatch is more fail-safe and feasible, but does not solve the main problem. A semiconductor radiation detector is responsible to other, nonradioactive emissions, mechanical and climatic effects. It also requires a high-voltage current. It is not possible to eliminate this problem of semiconductor detectors in certain kinds of equipment.

The monitoring of radiation can be done by means of Geiger-Muller counter, which is used in individual dosimeters. However, such devices have not been used in wristwatch and other compact devices until today, because the Geiger-Muller counter requires constant voltage of about 400V.

The aim of the current invention is to use a Geiger-Muller counter as a radiation detector in a personal wristwatch and to ensure its functioning over a long period of time. A voltage changer, able to change voltage from 1.5V-3V to 400V, is needed to make the Geiger-Muller counter function in a wristwatch and other compact devices.

There is known a voltage changer containing an energy source, for example: solar cell or solar battery, converter of direct current into alternating current by means of a switch key, an electric transformer and AC/DC converter. The switch key disconnects one winding or another, and windings are made different so as to make it possible to adjust the output voltage [3].

The disadvantage of the known device and its implementation method lies in impossibility to adjust precisely the output voltage and relatively high energy consumption.

A device for converting direct current into a high-voltage direct current was taken as a prototype for voltage changing method and voltage changer itself. The device has several outputs a pulse converter with a controller, which operates electronic switches, a step-up transformer with an AC/DC converter, and a filter, where the output voltage is forwarded to controller through divider [4].

Disadvantage of the known device and its implementation method is that feedback leakage wastes a lot of energy, and for this reason the device fed by compact power supply unit cannot keep functioning over a long period of time.

The object of current invention is to use Geiger-Muller counter as a radiation detector in a personal wristwatch and to ensure its functioning over a long period of time.

DISCLOSURE OF THE INVENTION

This task is solved as follows: in the present invention, a portable watch and radiation monitor assembly, includes a case, a timekeeping and time indicating unit, a radiation intensity measurement unit, a radiation detector, a control unit (micro controller), a display unit and a power supply unit. A Geiger-Muller counter functions as a radiation detector, and a voltage pulse converter is connected for the Geiger-Muller counter power supply; and the micro controller is connected to the voltage changer.

The problem is solved as follows: A Geiger-Muller counter is provided with an additional switch key that is connected to the micro controller and ensures measuring of radiation intensity in a gating mode.

The problem is also solved by the fact that the watch incorporates an additional power supply for separate powering of the timekeeping/displaying unit and radiation intensity measurement unit.

Additionally, a Geiger-Muller counter actuation pulse former, includes an input that is connected to the low-voltage side of the power supply filter capacitor of the Geiger-Muller counter, and its output is connected to the micro controller.

The objective of the invention is achieved also by installing filter-rectifier applying a reference voltage from secondary coil tap of the transformer to the cathode of the Geiger-Muller counter.

The objective is achieved also by the following: in known method of converting a low voltage into high constant voltage by converting of direct current into pulse current by means of electronic switch key, the rise of impulse voltage up to a predetermined value is achieved by means of step-up transformer, with the subsequent rectification, stabilization and filtering of the achieved impulse voltage. In the present invention, the return impulse voltage at primary winding is being compared with the predetermined value when the switch key opens and the switch key controls impulse frequency that is changed depending on overshooting of the return impulse voltage at primary winding over predetermined value. The switch key control impulses come from the micro controller and an additional switch key control impulse is sent when the signal from the Geiger-Muller counter is received.

The objective is achieved also as far as the return impulse voltage at primary winding is being compared with the predetermined value by a threshold element.

The objective of the invention is achieved also by the following innovation: in the present invention, in the known compact voltage changer, preferably for portable timepieces and devices, containing direct voltage source, a unipolar transistor functions as a disconnecting piece. A step-up transformer, micro controller, rectifier and filter of the output voltage, and the threshold element, installed into the primary winding, is connected to the micro controller while the micro controller data bus is connected to the unipolar transistor base.

A new technical result was achieved after solving this problem: utilization of the Geiger-Muller counter in the above mentioned device increased its measurement precision. This device can be used not only for everyday purposes, but also as a standardized measuring device. Applying of the Geiger-Muller counter together with compact voltage changer controlled by the micro controller according to pulse-frequency scheme allows to substantially reduce current consumption and to extend the functioning period of the device fed by one power supply source up to one year.

Additionally, providing the Geiger-Muller detector with additional switch key allows measuring of the radiation intensity not all the time, but only when the additional switch key is opened in a gating mode. The Geiger-Muller counter is enabled periodically, and switches off after receiving the signal. If the signal from the Geiger-Muller counter was not received, the counter does not switch off during the following time period. Sum of periods of time starting from enabling the counter and ending at receiving of the signal per unit of time permits to calculate a precise average radiation level. This technique makes it possible to reduce electric energy consumption by 80% during high radiation dose. Also, to return the Geiger-Muller counter to a wait state at some point in time is needed to stop the ionization, otherwise a high nonlinearity appears at high signal levels. Thus, switching the counter off for a certain part of the period permits to extend the measurement range and to increase measurement precision in different measurement ranges.

Applying the new method of converting direct voltage into stabilized high direct voltage together with applying of the Geiger-Muller counter as a secondary winding load of the transformer helps to solve the problems of the conventional art.

BRIEF DESCRIPTION OF THE ATTACHED FIGURES

Figure 2:
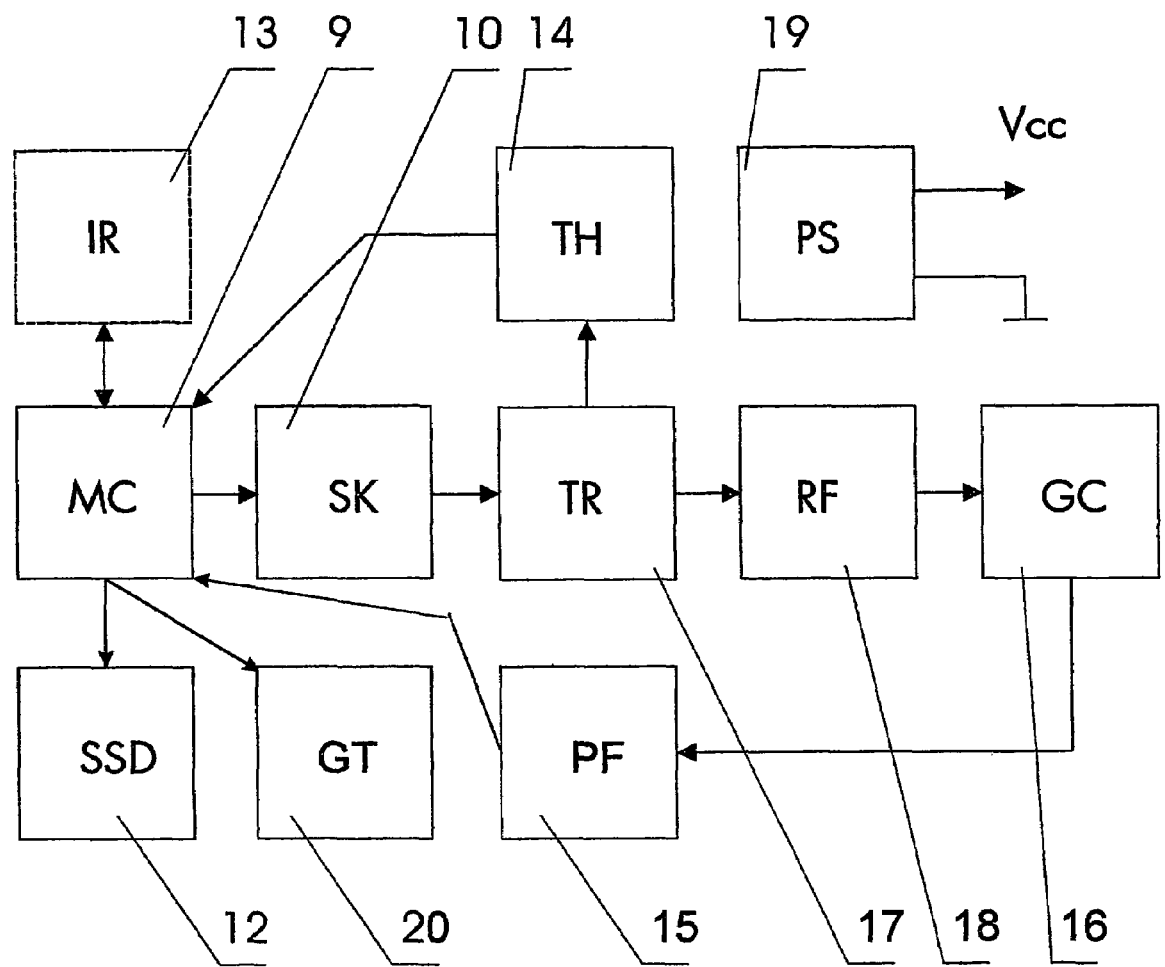
Figure 3:
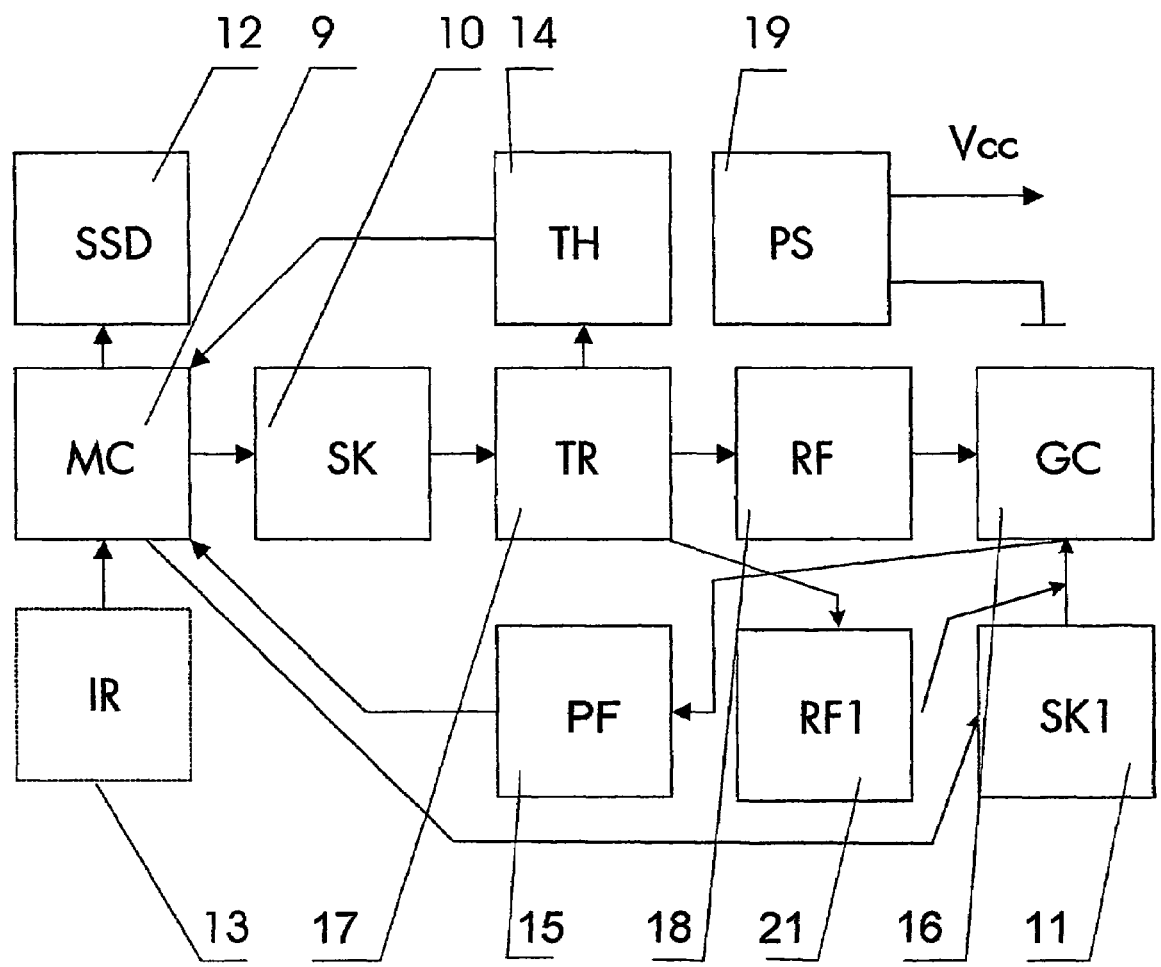
Figure 4:
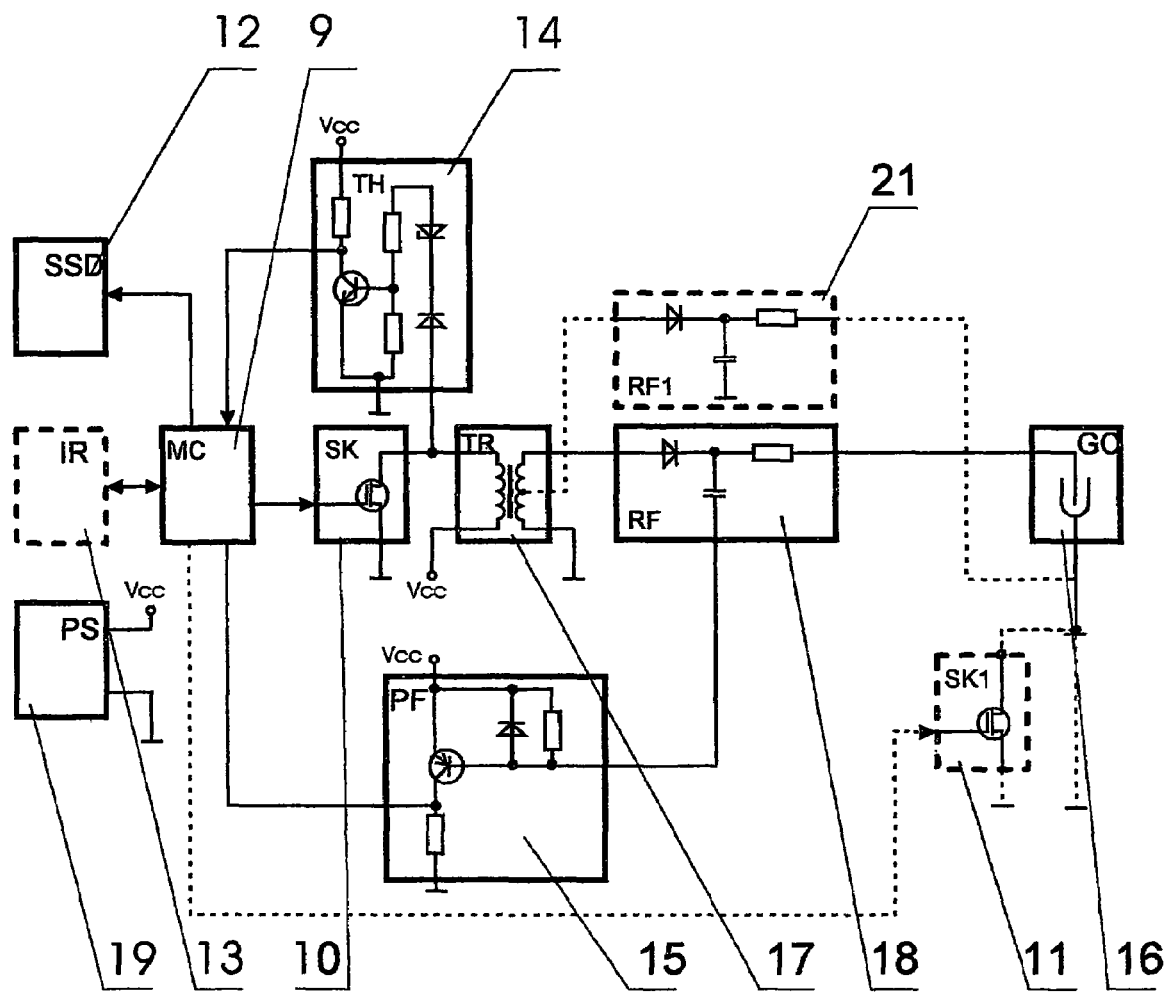
Figure 5:
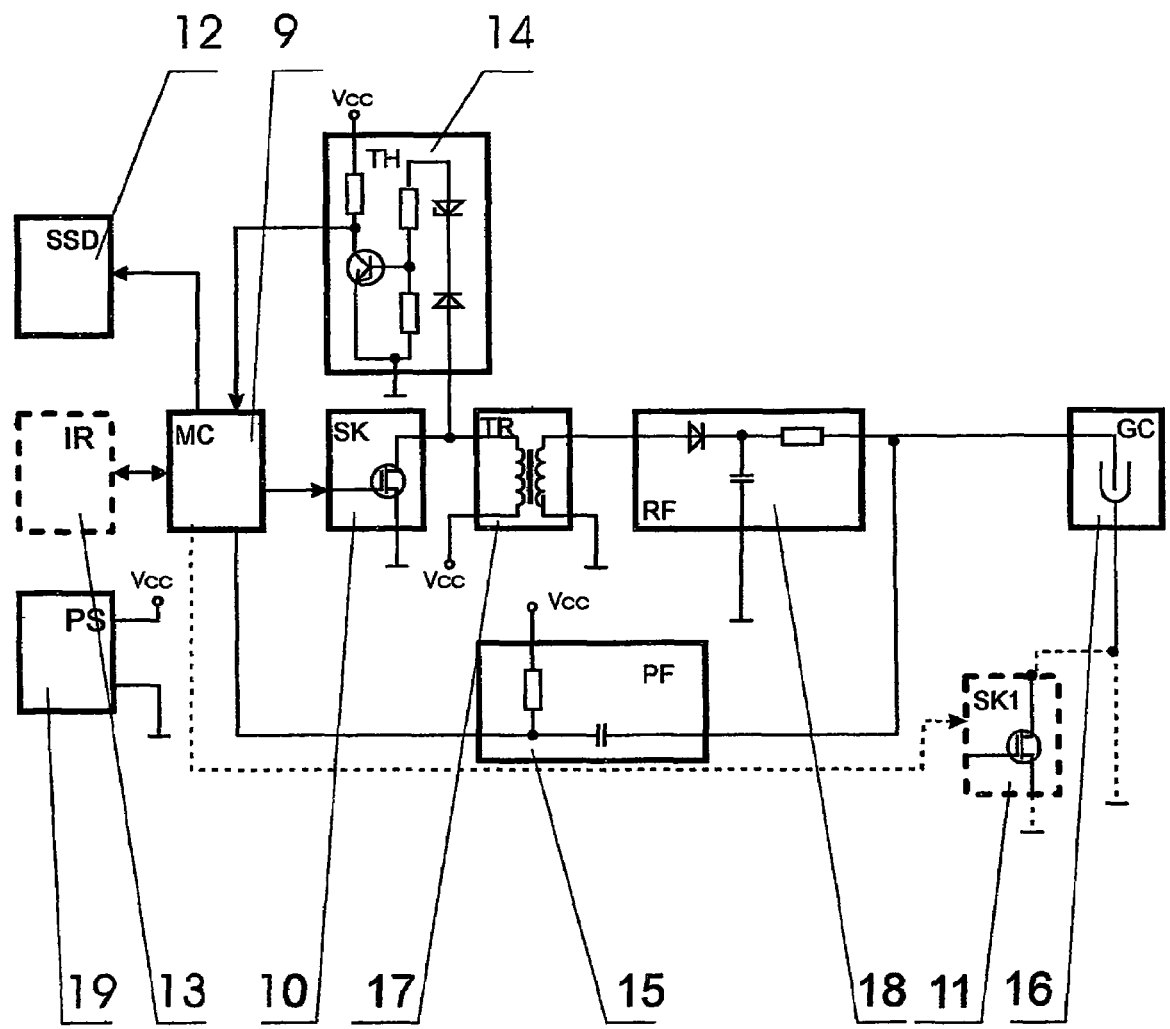
Figure 6:
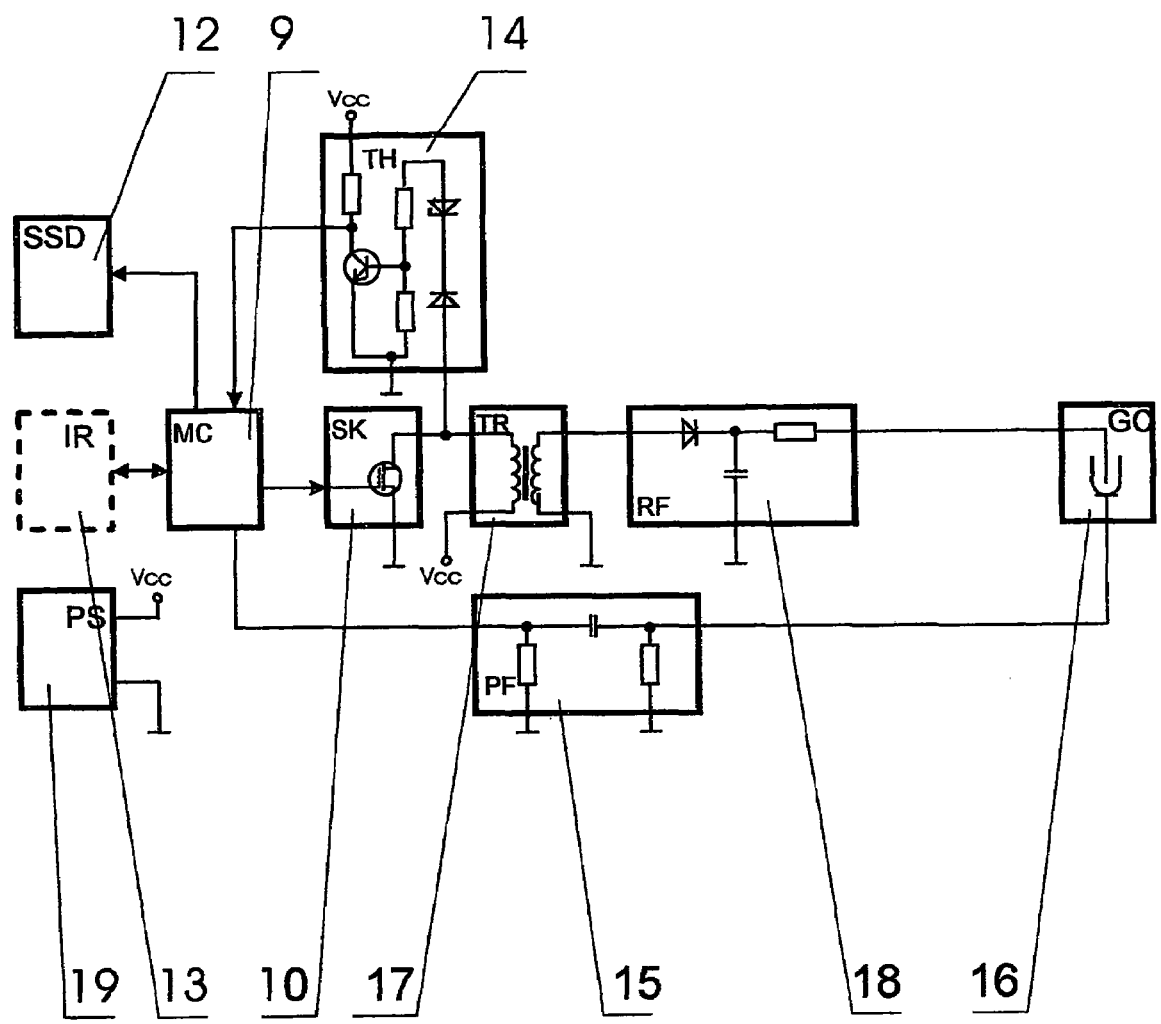

The invention is illustrated by the following figures.
FIG. 1—general view of the assembly.
FIG. 2—functional schematic of the assembly.
FIG. 3—functional schematic of the assembly with an extended measurement range (additional switch key on the Geiger-Muller detector).
FIG. 5—principle circuit of the assembly with a simplified principle of operation.
FIG. 6—principle circuit of the assembly with a simplified principle of operation but with different signal pickup compared to FIG. 5.

DETAILED DESCRIPTION OF EMBODIMENTS OF THE INVENTION

A portable watch with radiation meter and compact voltage changer includes framework 1 of the device, with placed on the framework 1 under glass (not shown) a clock-face 2 having different sections for displaying different alphanumerical and analog information. Thus, section 3 displays numerical information and operating mode of the device. Section 4 displays accumulated radiation dose, the intensity of the radiation is displayed on pseudo-analog scale in section 5. Hands 6 of the clockwork 7 are constantly indicating time. Buttons 8 manipulate the watch.

The device includes the following functional units. The whole device is operated by micro controller 9 (MC), which operates switch keys 10 (SK) and 11 (SK1), as well as sound signaling device 12 (SSD) and infra-red transceiver 13 (IR) providing communication between the device and computer (not shown).

Also the, micro controller 9 receives signals from threshold device 14 (TH) and signals from the Geiger-Muller counter 16 (GC) that pass through a pulse former 15 (PF). The switch key 10 is placed in the winding of transformer 17 (TR). The latter is connected to a threshold device 14 and to a rectifier with filter 18 (RF). Voltage from the latter is passed to the Geiger-Muller counter 16. The device has a power supply unit 19 (PS). Micro controller 9 drives the gear train 20 (GT) that turns the analog hands 7 of the watch. Buttons 8 command the micro controller 9. To speed up the functioning of the device, there is a rectifier-filter 21 (RF1) whose input is connected to a secondary winding of transformer 17 and whose output is connected to negative electrode of the Geiger-Muller counter 16.

The device functions as follows. Micro controller 9 operates all components of the device. Micro controller 9 forms impulses for operating the switch key 10 of the high-voltage transformer, receives and processes pulse pattern coming from the Geiger-Muller counter 16, calculates the measured values of minimum effective dose (MED) and effective dose (ED), compares measured values of (MED) and (ED) with the predetermined values and yields a sound signal to sound signaling device 12, if they exceed the predetermined values. Micro controller 9 also operates also the internal clock, calendar, alarm, carries out commands received from control buttons, controls running regime of the liquid-crystal display (3, 4, 5), and checks condition of power supply units of the device.

To provide functioning of the gas-discharge Geiger-Muller counter 16, there is a transformer converts DC low voltage U=3V into high voltage U=400V. The converter consists of: micro controller 9, switch key 10, transformer 17, rectifier with filter 18, threshold device 14. The high voltage converter is a single-ended converter with reverse connection of rectifier diode. Also, AC currents flow in the winding of transformer.

Micro controller 9 sends a control pulse to switch key 10. When the switch key is opened, a current pulse accumulates energy in the primary coil of the transformer 17. Rectifier diode of the rectifier 18 is locked at that moment. Charge accumulates in accordance with the primary coil inductance value, while a constant voltage at the detector 16 is maintained by filter 18 capacitor. When the switch key 10 is closed, voltage polarity at the secondary winding of the transformer changes, and the accumulated charge passes through the rectifier diode 18 to the load and charges the filter 18 capacitor. Thus, transmission of energy from power supply to the load is carried out in two steps; each of the steps is implemented in separate time-span.

To stabilize the high voltage level, a method of invariant stabilization was used, i.e., an absence of closed output voltage deviation control loop. Its stability is maintained by an indirect parameter actuating path, using two parameters: parameter (a)—by impulse value of the reverse motion on the primary winding of the transformer 17 and parameter (b)—by change in speed of counting impulses that come from the Geiger-Muller detector 16. This method permits deletion of feedback circuit with leakage and to considerably extend the period of functioning of the power supply unit.

The threshold device 14 is used to control the high voltage level by parameter (a). The threshold device 14 compares impulse value of the reverse motion on the primary winding of the transformer 17 with the threshold value. Micro controller 9 functions as a pulse-frequency modulator. When the level of the impulse of the reverse motion on the primary winding of the transformer 17 falls below the threshold value, the repetition rate of switch key control impulses rises. When the level of the impulse of the reverse motion on the primary winding of the transformer 17 exceeds the threshold value, the repetition rate of switch key control impulses falls.

The Geiger-Muller counter 16 readings are used to regulate the high voltage level by parameter (b). When micro controller 9 receives impulse from the Geiger-Muller counter 16, it generates a control impulse for switch key 10. This path provides stable operation of the transformer when there are dynamic load changes. Operation of the Geiger-Muller counter causes discharge of the capacitor and a bucking effect in the counter power supply unit. This demands immediate voltage buildup at capacitor 18 and the micro controller 9 immediately sends a control impulse to switch key 10.

Impulses are received from the Geiger-Muller counter 16 at the pulse former 15. The pulse former 15 converts impulses from Geiger-Muller counter into impulses of the required shape so as to make it possible for micro controller 9 to process them (FIG. 6).

A circuit in FIG. 5 of the signal pickup from Geiger-Muller counter 16 anode is used for special detectors which provide a wider range of dose intensity measurements, due to reduction of circuit capacitance. The last circuit can be supplemented with switch key 11 to even further widen the range of the device measurable rates of radiation.

High voltage control circuit includes the micro controller 9 (MC), switch key 10 (SK), transformer 17 (TR) and threshold device 14 (TD). Switch key 10 (SK) and transformer 17 (TR) operate as a circuit of the reverse motion transformer. This functions as follows: during the first stage (forward trace), the micro controller 9 generates a logical "one", which opens switch key 10. At the same time, linearly increasing current flows through the primary winding of the transformer. During the second stage (reverse motion), micro controller 9 generates a logical "zero", the switch key 10 closes, current flows through the secondary winding of the transformer and charges the accumulating capacitor of the filter 18 (RF). Voltage of the primary winding is proportional to voltage of the filter capacity. Voltage regulator diode of the threshold device 14 (TD) is closed until the voltage reaches operating value. A transistor of the threshold device 14 is closed as well.

During the reverse motion, micro controller 9 analyses operating condition of the threshold device 14 and if the operating voltage has not reached the required level, the entire procedure is repeated. When during the reverse motion operating voltage at the output of the rectifier 18 reaches the required level, voltage regulator diode of the threshold device 14 opens, a negative polarity pulse is generated on the capture anode of the transistor, and sends signals to the micro controller 9 to stop the process of pumping of high voltage. The threshold device circuit consumes energy only during a very short period (about 2 microseconds) of reverse motion impulse and only after the operating the transistor level of high voltage is reached. The rest of the time the transistor of the threshold device 14 is closed and power supply energy is not used.

Automatic control of how often the high voltage is being pumped is done in the following way. Micro controller a clears the pulse counter before the subprogram of high voltage pumping starts running. Then micro controller a counts how many impulses there should be in the pulse burst to reach the required operating level of high voltage on the output capacitor of the filter 18. If this value N exceeds the maximum fixed $N_{max}$, the interval between pulse bursts is shortened, and vice versa, if N doesn't reach $N_{min}$, the interval is longer. Finally, an optimal pulse repetition rate is determined, which permits to compensate for leakage in rectifier 18, filter and Geiger-Muller counter 16. Little energy is needed. Additional subprogram of micro controller a permits to compensate energy loss in the accumulating capacity of the filter caused by reception of gamma-quantum into the counter 16. The subprogram is started immediately after detection of impulse from the Geiger-Muller counter 16 by the micro controller 9.

A circuit for signal pickup from the Geiger-Muller counter 16 (FIG. 5) is used for special sensing devices which provide a wider range of dose intensity measurements. Switch key 11 serves for compulsory switch-off of the Geiger-Muller counter 16. Micro controller 9, by means of the switch key 11, periodically switches on the GC counter 16, and switches it off immediately after receiving the signal. Such a pattern permits to reduce the effect of "idle" time and of the recovery time of the counter 16. "Idle" time refers to during which one gamma-quantum ionizes in the counter 16, and if another gamma-quantum gets into the counter 16 at that time, it does not produce any changes.

The result of using the additional switch key 11 is that the device can measure dose intensity in a wider range.

Rectifier-filter 21 (RF1) takes current from the secondary winding of the transformer 17 additional voltage level which is close to the operating level and applies it to the cathode of the Geiger-Muller counter (16). This speeds up the process (saves time) of switching on and ensures the switch-off of the counter 16 when the switch key 11 is opened. Pulses from the Geiger-Muller counter are amplified by pulse former 15, the latter being a fast amplifier cascade with a common emitter. Basic diode of the pulse former 15 transistor is shunted by the diode through which the charge of high-voltage rectifier 18 capacitor flows. Then the signal from the output of the pulse former 15 is received at the counting input of the micro controller 9.

By means of buttons, micro controller 9 is commanded to display numerical information in the section 3 of the face of the watch, displaying calendar, current time, and the accumulated radiation dose.

The watch can incorporate an infra-red transceiver 13 (IR) which provides communication between the watch and a computer. In this case when the wearer passes an infra-red computer interface, the device connects to the computer and offers information about the wearer and the current accumulated dose.

Research has revealed that the device ensures high accuracy of measurement and the functioning period of the device fed by one power supply item is up to one year.

Relevant sources of information:

[1] U.S. Pat. No. 4,733,383, Cl. G 04B 47/00, 22 Mar. 1988.

[2] U.S. Pat. No. 5,469,412, Cl. G 04B 37/00, 21 Nov. 1995.

[3] International application WO 02/087062A3, Cl. H02M 1/10, 31 Oct. 2002.

[4] International application WO 02/071586A3, Cl. H02M 3/335, 12 Sep. 2002.

The invention claimed is:

1. A portable watch comprising:
a case;
a power supply unit in said case;
a micro controller in said case operatively connected to said power supply unit for receiving power therefrom;
a timekeeping and time indicating unit in said case operatively connected to said micro controller for operation thereby;
a Geiger-Muller counter in said case for detecting radiation and for delivering corresponding signals to said micro controller for calculation of an effective radiation dose therein;
a voltage pulse converter connected between said micro controller and said Geiger-Muller counter for transforming a low voltage from said micro controller into a constant high voltage for transmission to said Geiger-Muller counter; and
a pulse former connected to and between said Geiger-Muller counter and said micro controller for converting impulses from said Geiger-Muller counter into predetermined shapes for processing in said micro controller.

2. A portable watch comprising:
a case;
a power supply in the case;
a micro controller in the case connected to the power supply for receiving power therefrom;
a timekeeping and time indicating unit in the case connected to the micro controller for operation thereby;
a Geiger-Muller counter in the case for detecting radiation and for delivering corresponding signals to the micro controller for calculation of an effective radiation dose rate;
a voltage pulse converter connected between the micro controller and the Geiger-Muller counter for transforming a low voltage from the micro controller into a constant high voltage for transmission to the Geiger-Muller counter, wherein the voltage pulse converter is controlled by the micro controller using a first MOSFET switch;
a second MOSFET switch controlled by the micro controller and connected to the Geiger-Muller counter for forcing the Geiger-Muller counter to turn off;
a threshold device connected to the micro controller and to the voltage pulse converter to control the constant high voltage, the threshold device receiving a control input at a first bipolar transistor; and
a pulse former connected to and between the Geiger-Muller counter and the micro controller for converting impulses from the Geiger-Muller counter into predetermined shapes for processing in the micro controller, the pulse former including a second bipolar transistor whose output is connected to the micro controller.

3. The portable watch of claim 2, wherein the first MOSFET switch is connected between the micro controller and the Geiger-Muller counter for measuring radiation intensity in a gating mode in response to a signal from the micro controller.

4. The portable watch of claim 2, further comprising a second power supply unit in the case operatively connected to the timekeeping and time indicating unit for operation thereof independently of the micro controller.

5. The portable watch of claim 2, wherein the pulse former has an input connected to a low-voltage side of a power supply filter capacitor of the Geiger-Muller counter and an output connected to the micro controller.

6. The portable watch of claim 2, wherein the voltage pulse converter includes a transformer having a primary winding operatively connected to the micro controller and a secondary winding connected to a cathode of the Geiger-Muller counter for applying a reference voltage to the cathode.

7. The portable watch of claim 6, further comprising a switch key operatively connected to and between the micro controller and the primary winding of the transformer, a threshold device operatively connected to and between the primary winding and the micro controller and a rectifier having a filter operatively connected to and between the secondary winding and the cathode of the Geiger-Muller counter for passing voltage to the cathode.

8. The portable watch of claim 2, further comprising a display section on the case for displaying an indication of the accumulated radiation dose.

9. A portable watch comprising:
a watch case enclosing a power supply, a micro controller receiving power from the power supply, and a timekeeping unit controlled by the micro controller;
a Geiger-Muller counter in the watch case, the Geiger-Muller counter being connected to the micro controller for calculation of an effective radiation dose rate;
a voltage pulse converter connected between the micro controller and the Geiger-Muller counter for transforming a low voltage from the micro controller into a constant high voltage supplied to the Geiger-Muller counter, wherein the voltage pulse converter is controlled by the micro controller using a first switch;
a second switch controlled by the micro controller and connected to the Geiger-Muller counter for forcing the Geiger-Muller counter to turn off;
a threshold device connected to the micro controller and to the voltage pulse converter to control the constant high voltage, the threshold device receiving a control input at a first transistor;
a pulse former connected between the Geiger-Muller counter and the micro controller for converting impulses from the Geiger-Muller counter, the pulse former including a second transistor whose output is connected to the micro controller; and
a rectifier connected between the pulse former and the cathode of the Geiger-Muller counter.

10. The portable watch of claim 9, wherein the first switch is a CMOS switch.

11. The portable watch of claim 10, wherein the second switch is a CMOS switch.

12. The portable watch of claim 9, wherein the voltage pulse converter includes a transformer having a primary winding connected to the micro controller and a secondary winding connected to a cathode of the Geiger-Muller counter.

13. The portable watch of claim 12, further comprising a rectifier having a filter connected between the secondary winding and the cathode of the Geiger-Muller counter.

14. The portable watch of claim 9, wherein the second switch is connected to the cathode of the Geiger-Muller counter.

15. The portable watch of claim 9, wherein the first transistor is a bipolar transistor.

16. The portable watch of claim 9, wherein the second transistor is a bipolar transistor.

17. A portable watch comprising:
a watch case enclosing a power supply, a micro controller receiving power from the power supply, and a timekeeping unit connected to the micro controller and controlled by the micro controller;
a Geiger-Muller counter in the watch case, the Geiger-Muller counter being connected to the micro controller for calculation of an effective radiation dose rate;
a voltage pulse converter connected between the micro controller and an anode of the Geiger-Muller counter for transforming a low voltage from the micro controller into a constant high voltage supplied to the Geiger-Muller counter, wherein the voltage pulse converter is controlled by the micro controller using a first switch;
a second switch controlled by the micro controller and connected to a cathode of the Geiger-Muller counter;
a threshold device connected to the micro controller and to the voltage pulse converter to control the constant high voltage, the threshold device receiving a control input at a first transistor;
a pulse former connected between the Geiger-Muller counter and the micro controller for converting impulses from the Geiger-Muller counter; and
the voltage pulse converter including a first rectifier connected between the pulse former and the anode of the Geiger-Muller counter,
wherein the pulse converter includes a transformer having a primary winding connected to the micro controller and a secondary winding connected to a cathode of the Geiger-Muller counter through a second rectifier.

18. The portable watch of claim 17, wherein the micro controller also calculates an effective radiation dose.

* * * * *